US007005917B2

(12) United States Patent
Kirn

(10) Patent No.: US 7,005,917 B2
(45) Date of Patent: Feb. 28, 2006

(54) POWER SUPPLY REJECTION TECHNIQUE FOR SWITCHING AMPLIFIER

(75) Inventor: Larry Kirn, West Bloomfield, MI (US)

(73) Assignee: JAM Technologies, Inc., Boston, MA (US)

( * ) Notice: Subject to any disclaimer, the term of this patent is extended or adjusted under 35 U.S.C. 154(b) by 0 days.

(21) Appl. No.: 10/405,821

(22) Filed: Apr. 2, 2003

(65) Prior Publication Data

US 2003/0184270 A1    Oct. 2, 2003

Related U.S. Application Data

(60) Provisional application No. 60/369,411, filed on Apr. 2, 2002.

(51) Int. Cl.
*H03F 3/38* (2006.01)
(52) U.S. Cl. ...................................... 330/10; 330/207 A
(58) Field of Classification Search ................. 330/10, 330/207 A, 251
See application file for complete search history.

(56) References Cited

U.S. PATENT DOCUMENTS

| | | | | |
|---|---|---|---|---|
| 5,077,540 A | * | 12/1991 | Keith et al. ................. 330/251 |
| 6,466,087 B1 | * | 10/2002 | Ruha ............................ 330/10 |
| 6,504,427 B1 | * | 1/2003 | Midya et al. ................. 330/10 |
| 6,538,505 B1 | * | 3/2003 | Kirn ............................ 330/10 |
| 6,781,453 B1 | * | 8/2004 | Kirn ............................ 330/10 |

* cited by examiner

*Primary Examiner*—Steven J. Mottola
(74) *Attorney, Agent, or Firm*—Gifford, Krass, Groh, Sprinkle, Anderson & Citkowski, PC

(57) ABSTRACT

Apparatus and methods greatly improve AC and, optionally, DC power supply rejection in a switching amplifier. The method broadly includes the steps of modulating the amplifier output with a compensatory signal necessary to maintain a minimum difference between an otherwise unmodulated ancillary reference switching amplifier and a static or dynamic reference.

2 Claims, 2 Drawing Sheets

POWER SUPPLY REJECTION TECHNIQUE FOR SWITCHING AMPLIFIER

REFERENCE TO RELATED APPLICATION

This application claims priority to U.S. Provisional Patent Application Ser. No. 60/369,411, filed Apr. 2, 2002, the entire content of which is incorporated herein by reference.

FIELD OF THE INVENTION

This invention relates generally to switching amplifiers and, in particular, to a power supply rejection technique therefore.

BACKGROUND OF THE INVENTION

The measured ability of any amplifier to isolate incoming power supply noise and disturbances from the load has obvious sonic and economic benefits. To meet this objective, analog amplifiers employ many techniques, such as heavily-filtered bias supplies and differential drive.

Switching amplifiers, particularly those with saturated output switching devices connected directly to the incoming power supply, have proven more intractable to improvements in this area; in that the supply is switched directly to the load. A need exists for a technique through which power supply rejection of incoming disturbances can be improved in switching amplifiers.

SUMMARY OF THE INVENTION

The present invention provides apparatus and methods for greatly improving AC and, optionally, DC power supply rejection in a switching amplifier. The method broadly includes modulating the amplifier output with a compensatory signal necessary to maintain a minimum difference between an otherwise unmodulated ancillary reference switching amplifier and a static or dynamic reference.

DETAILED DESCRIPTION OF THE INVENTION

Figure 1:
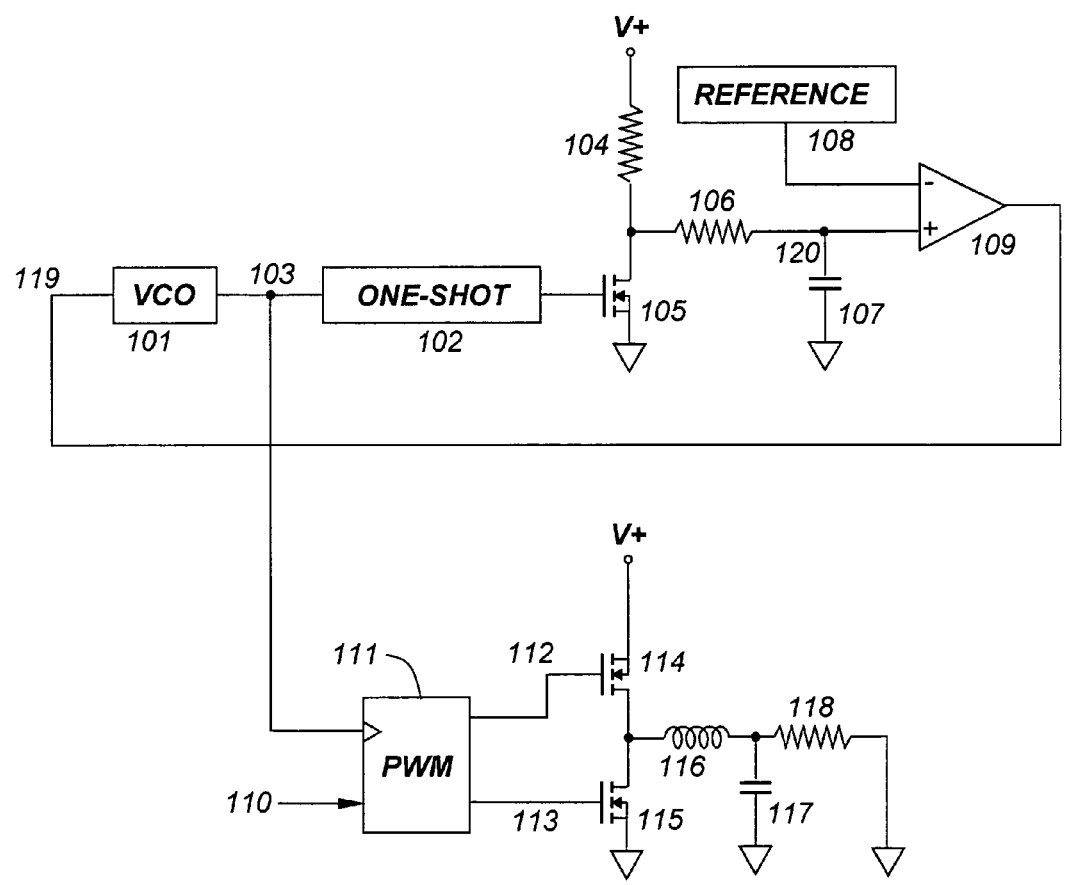
FIG. 1 shows a preferred embodiment of the present invention employing analog feedback.

FIG. 1 shows a preferred embodiment of the present invention employing analog feedback. In this circuit, a voltage controlled oscillator 101 supplies a pulse train 103 to both a fixed-period one-shot 102 and a pulse-width modulator 111, the frequency of which is directly proportional to incoming control voltage 119. The output of one shot 102 directly drives switching device 105.

When activated, switching device 105 presents zero volts to resistor 106; resistor 104 presents V+ volts to resistor 106 when switching device 105 is inactivated. Resistor 106, in conjunction with capacitor 107, filters the resultant pulse-width-modulated voltage 120 of resistor 104 and switching device 105 for input to the non-inverting input of error amplifier 109. Note that the filtered pulse-width-modulated voltage 120 is directly proportional to supply voltage V+ and inversely proportional to the pulse train 103 output from VCO 101. Resultantly, voltage 120 is inversely proportional to control voltage 119.

Error amplifier 109, the output of which controls voltage-controlled oscillator 101 via control voltage 119, compares feedback voltage 120 to reference voltage 108. This foregoing feedback loop closure results in a trigger pulse train 103 frequency necessary to maintain the average product of V+ and one shot 102 period at reference voltage 108. This condition can be seen to be stable with all V+ variances both slower than the response time of the resistor 106 and capacitor 107 filter, and within system compliance.

Pulse-width modulator 111 receives modulation input 110 and trigger pulse train 103 as input, processing the information into control pulse width trains 112 and 113 to control switching devices 114 and 115, respectively. It is assumed that pulse-width modulator 111 is comprised primarily of down-counters clocked by the incoming pulse stream 103 and initiated by sample data imbedded in data stream 110, in a manner well-known in the art. It is further assumed that the down-counter form of pulse-width modulation will result in decreased control pulse widths to switching device 114 (with resultant decreased V+ pulse output) with increasing frequency of pulse stream 103.

Inductor 116, in conjunction with capacitor 117, filters pulse widths obtained from switching devices 114 and 115 into an average modulated voltage across load 118. Specific pulse-width modulation techniques abound in the art and are not important to this discussion, within the constraint that modulator 111 produces eventual output across load 119 that is inversely proportional to the frequency of trigger pulse train 103, and preferably directly proportional to modulating input 110 as well.

By the discussion above, it can be seen that the eventual output expressed across load 118 is the product of V+, modulating input 110 (subject to linearity of pulse-width modulator 111), and the period of trigger pulse train 103. In that the frequency of trigger pulse train 103 has been shown to be that required to maintain an average pulse width/V+ product 120 approaching that of reference voltage 108, V+ variances can be seen to be negated by the frequency of trigger pulse train 103. In that the same V+ is used for both feedback voltage 120 and the eventual output to load 118, it can therefore be seen that the frequency control of trigger pulse train 103 as well cancels V+ variances at load 118, within system compliance.

Note that use of a fixed absolute voltage for reference 108 will result in fixed-power amplifier operation (similar to that of feedback-controlled analog amplifiers known in the art), and that use of a dynamic reference 108 that is a function of the incoming power supply V+ will result in amplification with a variable output power proportional to the incoming power supply V+. With either dynamic or static reference 108, the technique disclosed herein has been shown to successfully reject even large power supply v+ perturbations extremely well.

Figure 2:
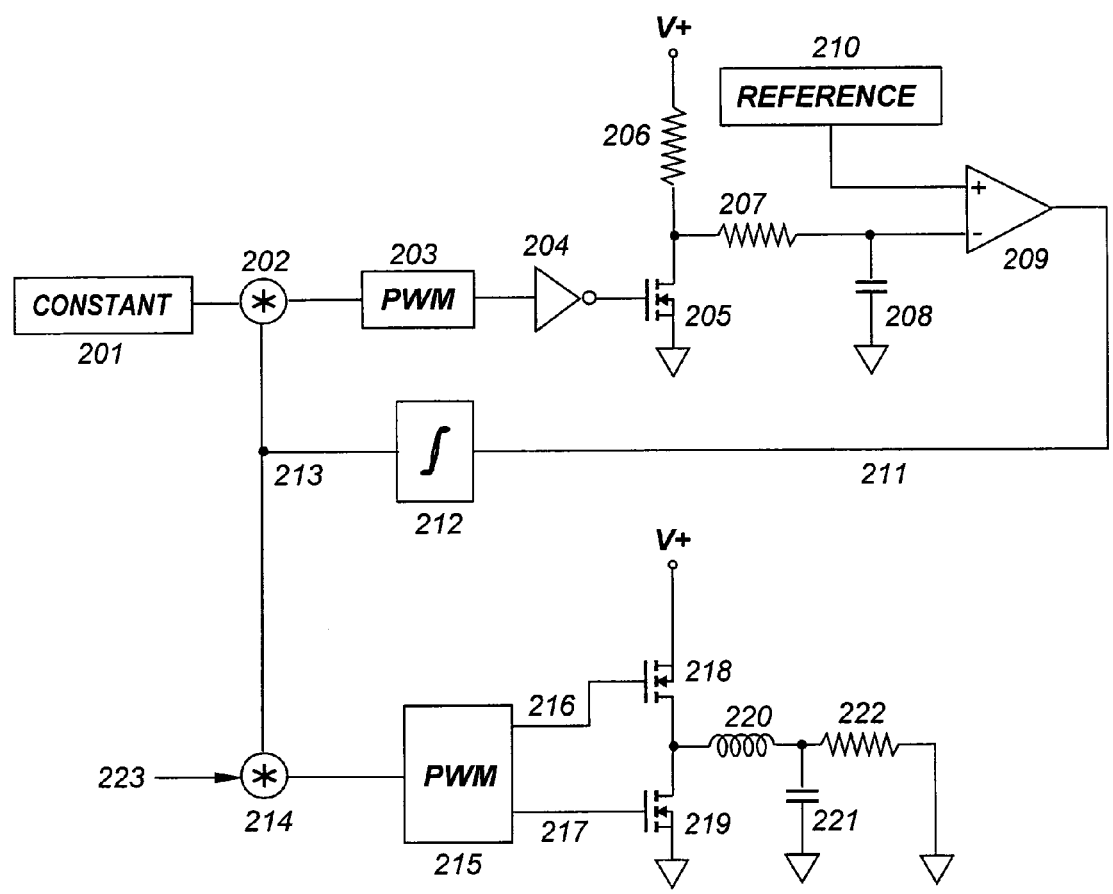
FIG. 2 shows a preferred embodiment of the present invention employing digital feedback.

Referring now to FIG. 2, multiplier 202 multiplies constant 201 by a corrective term 213 to provide the controlling input for pulse width modulator 203. Pulse-width modulator 203 yields a pulse width which is inverted by inverter 204 and applied as control to switching device 205. Switching device 205, resistors 206 and 207, capacitor 208, reference 210, and error amplifier 209 all provide equivalent function to their counterparts switching device 105, resistors 104 and 106, capacitor 107, reference 108, and error amplifier 109, all of FIG. 1. Integrator 212 increases or decreases the correction term 213, under control of error amplifier 209.

Corrective term 213 is applied as well to incoming data stream 223, through the action of multiplier 214, whose output is applied as control of pulse width modulator 215. Control signals 216 and 217, switching devices 218 and 219, inductor 220, capacitor 221, and load 222 all provide equivalent function to their counterparts control signals 112 and 113, switching devices 114 and 115, inductor 116, capacitor 117, and load 118, respectively, all of FIG. 1. Although the eventual output applied to load 222 is directly proportional to corrective term 213, the eventual output applied to load 118 of FIG. 1 is inversely proportional to control voltage 119. Equivalent functionality exists between the embodiments represented in FIGS. 1 and 2.

While pulse-width modulation, frequency modulation, and digital multiplicative scaling are shown herein, equally efficacious alternative corrective approaches and other modulation techniques are as well anticipated, as are various output stage topologies, including impedance transformation amplifiers, wherein output switching devices do not necessarily connect directly to the incoming power supply.

I claim:

1. A method of improving power supply rejection in a switching amplifier of the type wherein one or more output devices couple a power supply voltage to a load using a pulse-width modulator (PWM) controlled by an input signal, comprising the steps of:

providing a reference signal;

generating a compensatory signal as a function of the reference signal; and controlling the operation of the PWM with the compensatory signal to maintain a minimum difference between the reference signal and the voltage across the load.

2. The method of claim 1, wherein the reference signal is static or dynamic.

* * * * *